United States Patent Office 3,423,794
Patented Jan. 28, 1969

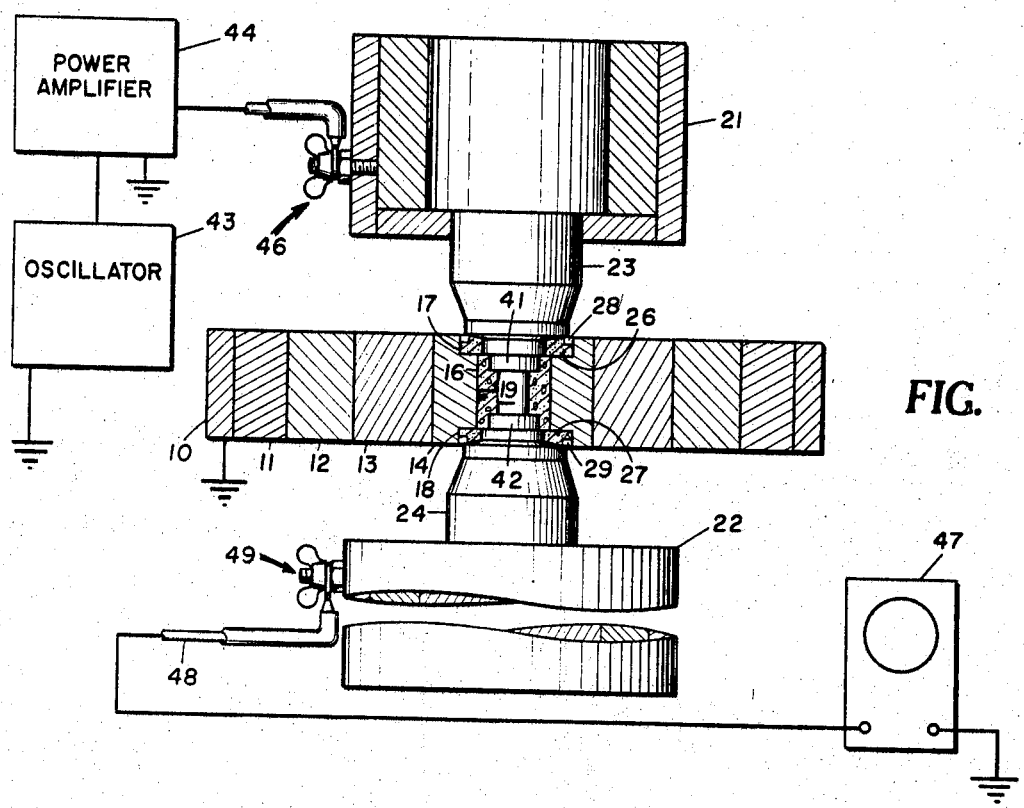
FIG. 1
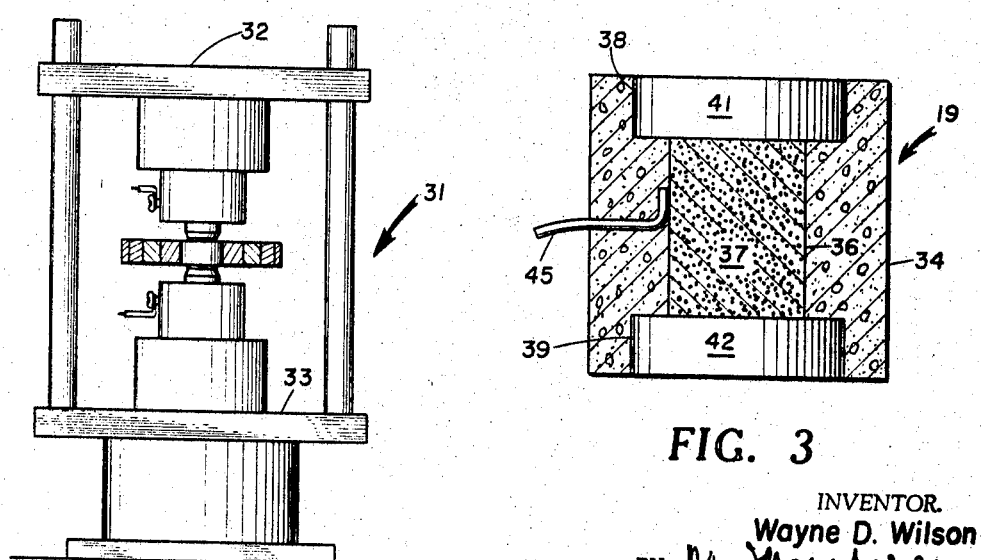
FIG. 2
FIG. 3
INVENTOR.
Wayne D. Wilson
BY
ATTORNEY.
AGENT.

3,423,794
ULTRASONIC METHOD FOR PRODUCING
PHASE TRANSITIONS IN MATERIALS AT
HIGH PRESSURES
Wayne D. Wilson, 2000 Wallace Ave.,
Silver Spring, Md. 20902
Filed June 30, 1964, Ser. No. 379,423
U.S. Cl. 18—16.5          5 Claims
Int. Cl. B29c 3/00

ABSTRACT OF THE DISCLOSURE

A method and apparatus for phase transforming certain materials. A specimen material to be phase transformed is placed in a pressure vessel and subjected to high pressure. An ultrasonic transducer placed in contact with the specimen material is excited to apply transverse ultrasonic shear waves to the specimen material so as to effect the phase transformation.

---

The invention described herein may be manufactured and used by or for the Government of the United States of America for governmental purposes without the payment of any royalties thereon or therefor.

This invention relates to the art of producing phase transitions in materials and more particularly to an ultrasonic method for producing such transitions at high pressures. One of the major contributions of high pressure physics has been the discovery that certain materials undergo transformations from one form to another, so-called phase transformations, when subjected to high pressures. This phenomenon has particular utility in the art of synthesizing crystalline material. However, the mere application of elevated temperature and static pressure is not sufficient in many cases to produce transformations.

Investigations involving the application of pressure to materials by means of a high intensity shock such as that obtainable from a shaped charge explosive have shown that a different and faster transformation mechanism seems to be present under those conditions than under static conditions, at least in some materials. It has been theorized that this result is due to the very large shearing stresses within the shock front. Accordingly, workers have been led to attempt to introduce additional shearing stresses in materials while they are under conditions of high temperature and high static pressure, in order to introduce the stress mechanism into the old processes. One method which has been suggested for this purpose is to rotate one of the pressure pistons which is conventionally employed to produce the high static pressure. This, however, is a difficult procedure and has the distinct disadvantage of producing a rotational shear rather than a transverse shear.

In many instances, the effect of the application of shear is to cause a transition to occur at lower pressure. For example, it has been reported that while the transition of red phosphorus to black phosphorus requires 80 kilobars pressure in the absence of shear, the transition can be made to take place at 45 kilobars when shear is applied.

Accordingly, an object of the present invention is to provide a method and apparatus for producing phase changes in materials at high pressure in a simplified manner.

Another object of the invention is to provide a novel method of producing a transverse shear in materials at high pressure.

Still another object of the invention is to provide apparatus for inducing a transverse shear wave in material under pressure for producing phase transitions therein and for conveniently monitoring the process.

These objects are achieved in the present invention by applying to the material under pressure a high intensity ultrasonic shear wave. This is accomplished by placing an ultrasonic transducer in contact with the specimen material in a pressure vessel. The pressure and temperature of the specimen are adjusted to values for which the material should transform into its new phase, and the high intensity shear waves are then transmitted through the specimen to effect the actual phase transformation. The application of ultrasonic shear waves has a distinct advantage over the old mechanical method in that the applied stress can be repeated in rapid succession and the induced waves are true transverse shear waves.

Other objects and advantages of the invention will be apparent from the following detailed description when considered in connection with the accompanying drawings wherein:

FIG. 1 is a vertical cross-section through a portion of the high pressure apparatus used in the present invention, showing in schematic form the electrical circuitry involved;

FIG. 2 is an elevational view of the apparatus of FIG. 1 in place in a hydraulic press apparatus; and FIG. 3 is a detailed showing of a specimen capsule in vertical cross-section.

The high pressure apparatus employed in the present invention is shown partially in FIG. 1. This apparatus is of the so-called stepped-core type consisting of a series of binding rings 10 to 13 confining a central tungsten carbide core 14. Core 14 is provided with a coaxial central bore 16 and counterbores 17 and 18 at each end thereof which provide the stepped configuration. The specimen capsule is shown in place in bore 16 in FIG. 1, and is designated by reference numeral 19.

In order to apply pressure to the capsule 19, opposed press pistons 21 and 22 are provided, each press piston terminating in a tungsten carbide anvil element, 23 and 24 respectively, which is configured to cooperate with the core 14. Potassium bromide gasket material is disposed in counterbores 17 and 18 in order to confine the applied pressure within the core 14, as shown at 26 and 27. Pyrophyllite rings 28 and 29 are embedded in the corners of the potassium bromide gaskets in order to prevent crumbling and extrusion of the gasket material between the press elements and the edge of the core.

Force is applied to the press pistons by means of a hydraulic press as shown in FIG. 2. The details of the press are not material to the present invention, the press being shown in FIG. 2 only for purposes of clarification. Essentially, the press consists of a pair of opposed arms 32 and 33 which may be drawn toward one another by hydraulic pressure. The apparatus shown in FIG. 1 is placed between press arms 32 and 33 as shown.

Specimen capsule 19 is shown in detail in FIG. 3. The capsule consists of a pyrophyllite block 34 machined on its outer surface to fit closely within bore 16. A coaxial bore 36 is provided in block 34 in which is disposed the specimen material to be transformed, generally designated at 37. Bore 36 terminates, at each of its ends, in counterbores 38 and 39. Within counterbores 38 and 39 are ultrasonic transducers 41 and 42, which may be, for example, barium titanate crystals.

Attention is directed to FIGS. 1 and 3 for a showing of the electrical apparatus which is used in the present invention. In the electrical hook-up as shown, transducer 41 is employed as a transmitter and transducer 42 is used as a receiver of the acoustic energy which passes through the specimen. In order to drive transducer 41, a pulse or sine wave oscillator 43 is employed, the output of which is amplified in a power amplifier 44 and applied to crystal 41 through press piston 21 and anvil 23. A binding post 46 on press piston 21 may be used to establish electrical contact. In order to establish electrical connection to the side of transducer 41 opposite anvil element 23, a wire 45 is embedded in pyrophyllite block 34. Wire 45 is in electrical contact with the specimen material 37 in bore 36. Of course, it is necessary in this arrangemnt that the specimen material 37 be a conductor of electricity. In the event that it is a nonconductor, electrical connection must be made directly with the surface of the transducer 41. As shown in FIG. 3, wire 45 protrudes from pyrophyllite block 34. When block 34 is dropped into bore 16 wire 45 is bent over and brought into electrical contact with core 14. The circuit is completed by grounding the binding ring 10 as shown.

As stated above, transducer 42 is employed as a receiving transducer and is useful when the apparatus is being used experimentally. By monitoring the acoustic energy transmitted through the specimen, it is possible to determine when the desired transition takes place since the acoustic transmission characteristics of the material will probably change at that time. Transducer 42 is not necessary in order to carry out the transition and may be dispensed with if desired.

Electrical connection is made to the inner surface of transducer 42 through wire 45 and the specimen material. Connection is established to the outer surface by contact with press piston 24. A cathode ray oscilloscope 47 is used to monitor the process. One side of the vertical input of oscilloscope 47 is connected to press piston 22 through lead 48 and binding post 49. The other side of the oscilloscope 47 is grounded as shown. Care must be taken to prevent shorting between the press pistons and the core 14 in order to avoid transmission of driving energy to transducer 42. To this end the amount of pyrophyllite and potassium bromide gasket material between the press pistons and the core element must be substantial before pressure is applied. If this insulation is maintained, the desired result will be achieved since each of the transducer crystals is a nonconductor and thus both sides of crystal 42 are at the same potential with respect to the oscillator 43.

In operation, the temperature and pressure within the capsule 19 are established at the desired levels. A carbon resistance furnace may have to be used in some instances, as is well known in the art. Once the proper conditions are established, oscillator 43 is turned on and transducer 41 is thereby driven to transmit an ultrasonic wave through specimen material 37. By proper selection of the orientation of the axis of transducer 41, this wave is made a transverse wave. The operation may be monitored on oscilloscope 47 as described above.

Thus it can be seen that the objects of the invention set forth above are successfully achieved by the present method and apparatus. By means of ultrasonic shear waves the specimen can be stressed dynamically many times in rapid succession. The nucleation of the reaction and the rate of transformation are materially increased.

Obviously, there are modifications and variations of the present invention which are possible in the light of the above teachings. It is therefore to be understood that within the scope of the appended claims, the invention may be practiced otherwise than as specifically described.

What is claimed is:

1. Apparatus for producing phase transformation in a material under high pressure comprising:
   (a) means for subjecting a material to high pressure, said means for subjecting including,
      (1) a tungsten carbide core having a central bore therethrough for containing the material to be transformed,
      (2) binder rings surrounding said core for reinforcing the same,
      (3) opposed press pistons in coaxial alignment with said bore and having tungsten carbide anvils thereon for contacting said material and imparting pressure thereto, and
      (4) hydraulic means for biasing said press pistons toward one another;
   (b) ultrasonic transducer means connectable to said material for transmitting a high intensity ultrasonic shear wave thereto; and
   (c) a specimen capsule containing said material to be transformed including,
      (1) a pyrophyllite block having a central bore therethrough, configured at its outer surface to fit within said bore in said core, and
      (2) counter bores at each end of said central bore in said block, said transmitting transducer means being disposed in one of said counterbores, and a receiving transducer being disposed within the other of said counterbores.

2. Apparatus as in claim 1, wherein said apparatus further comprises a source of cyclically varying electrical energy operatively coupled to said transmitting transducer.

3. Apparatus as in claim 2, wherein said apparatus further comprises means for measuring the voltage output of said receiving transducer.

4. Apparatus as in claim 3, wherein said material to be transformed is a conductor of electricity;
   a wire is embedded in said pyrophyllite block for establishing electrical continuity between said material and said binder rings when said block is in place in said core;
   said electrical energy source is coupled to one side of said transmitting transducer through one of said press pistons and to the other side of said transmitting transducer through said binder rings, said wire and said material; and
   said voltage measuring means is connected to one side of said receiving transducer through the other of said press pistons and to the other side of said receiving transducer through said binder rings, said wire and said material.

5. Apparatus as in claim 3, wherein each of said transducers is a barium titanate crystal and said transmitting transducer is oriented so as to establish a transverse shear wave in said material.

References Cited

UNITED STATES PATENTS

| | | | |
|---|---|---|---|
| 2,685,116 | 3/1954 | Schutt | 25—41 |
| 2,815,535 | 10/1957 | Bodine | 25—41 X |
| 2,941,248 | 6/1960 | Hall. | |
| 3,088,169 | 5/1963 | Wentorf. | |
| 3,137,896 | 6/1964 | Daniels. | |
| 3,274,660 | 9/1966 | Mizer et al. | 25—41 |

WILLIAM J. STEPHENSON, *Primary Examiner.*

U.S. Cl. X.R.

25—41